United States Patent
Sayama

(10) Patent No.: US 9,390,355 B2
(45) Date of Patent: Jul. 12, 2016

(54) IMAGE FORMING APPARATUS AND IMAGE FORMATION CONTROL METHOD

(71) Applicant: KYOCERA Document Solutions Inc., Osaka-shi (JP)

(72) Inventor: Haruki Sayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/715,331

(22) Filed: May 18, 2015

(65) Prior Publication Data

US 2015/0339559 A1    Nov. 26, 2015

(30) Foreign Application Priority Data

May 23, 2014  (JP) ................. 2014-106944

(51) Int. Cl.
*G06K 15/00* (2006.01)
*G03G 15/00* (2006.01)

(52) U.S. Cl.
CPC .......... *G06K 15/4075* (2013.01); *G03G 15/556* (2013.01)

(58) Field of Classification Search
USPC ....................................................... 358/1.15
See application file for complete search history.

(56) References Cited

U.S. PATENT DOCUMENTS

| 5,713,062 A * | 1/1998 | Goodman | G03G 15/104 399/223 |
| 5,923,356 A * | 7/1999 | Gibson | G03G 15/105 347/131 |
| 2003/0097947 A1 * | 5/2003 | Caruthers | G03G 15/0121 101/484 |
| 2005/0163516 A1 * | 7/2005 | Eom | G03G 15/553 399/12 |

FOREIGN PATENT DOCUMENTS

JP    2009-031446 A    2/2009

* cited by examiner

*Primary Examiner* — Ngon Nguyen
(74) *Attorney, Agent, or Firm* — Studebaker & Brackett PC

(57) ABSTRACT

An image forming apparatus includes an image forming section, a content fraction calculating section, and an information storage section. The content fraction calculating section calculates a content fraction of each of a plurality of toners contained in the image forming section that have been supplied from different toner cartridges to one another. The information storage section stores therein, for each of the toners, a control value that is used to control a component of the image forming section. The image forming section forms an image based on respective content fractions of the toners and respective control values for the toners.

9 Claims, 9 Drawing Sheets

| Serial number | Charging control value X | Development control value Y | Primary transfer control value Z |
|---|---|---|---|
| i | $X_i$ | $Y_i$ | $Z_i$ |

| Serial number | Charging control value X | Development control value Y | Primary transfer control value Z | Total supply amount P | Total consumption amount C |
|---|---|---|---|---|---|
| j | $X_j$ | $Y_j$ | $Z_j$ | $P_j$ | $C_j$ |
| k | $X_k$ | $Y_k$ | $Z_k$ | $P_k$ | $C_k$ |
| n | $X_n$ | $Y_n$ | $Z_n$ | $P_n$ | $C_n$ |
| ⋮ | ⋮ | ⋮ | ⋮ | ⋮ | ⋮ |

FIG. 5A

| Charging control value X | Development control value Y | Primary transfer control value Z |
|---|---|---|
| Xs–Xb | Ys–Yb | Zs–Zb |

FIG. 5B

| Charging control value X | Development control value Y | Primary transfer control value Z |
|---|---|---|
| Xd | Yd | Zd |

FIG. 5C

| Serial number | Charging control value X | Development control value Y | Primary transfer control value Z | Total supply amount P | Total consumption amount C |
|---|---|---|---|---|---|
| m | $X_d$ | $Y_d$ | $Z_d$ | $P_m$ | $C_m$ |
| j | $X_j$ | $Y_j$ | $Z_j$ | $P_j$ | $C_j$ |
| k | $X_k$ | $Y_k$ | $Z_k$ | $P_k$ | $C_k$ |
| n | $X_n$ | $Y_n$ | $Z_n$ | $P_n$ | $C_n$ |
| ⋮ | ⋮ | ⋮ | ⋮ | ⋮ | ⋮ |

IMAGE FORMING APPARATUS AND IMAGE FORMATION CONTROL METHOD

INCORPORATION BY REFERENCE

The present application claims priority under 35 U.S.C. §119 to Japanese Patent Application No. 2014-106944, filed May 23, 2014. The contents of this application are incorporated herein by reference in their entirety.

BACKGROUND

The present disclosure relates to an image forming apparatus and an image formation control method.

Image forming apparatuses such as copiers and multifunction peripherals that use electrophotography are commonly known. An electrophotographic image forming apparatus typically includes an image forming section that includes a photosensitive drum, a charging device, and a developing device. The charging device charges the photosensitive drum. An electrostatic latent image is formed on the photosensitive drum by irradiating a circumferential surface of the drum with laser light while in a charged state. The developing device forms a toner image by causing toner to adhere to the circumferential surface of the photosensitive drum on which the electrostatic latent image is formed. In an image forming apparatus that uses a primary transfer method, a toner image is transferred directly onto a sheet of paper from a photosensitive drum. In an image forming apparatus that uses a secondary transfer method, a toner image formed on a circumferential surface of a photosensitive drum is transferred onto a sheet of paper via an intermediate transfer belt.

An electrophotographic image forming apparatus typically has an exchangeable toner cartridge installed therein from which toner is supplied to a developing device. Note that toners differ in terms of properties such as chargeability depending on components included therein. Therefore, exchanging toner cartridges may unfortunately lead to variation in the amount of toner that adheres to a photosensitive drum.

In consideration of the above, an image forming apparatus has been proposed that controls each component of an image forming section in accordance with components of toner contained in a developing device. One specific example of an image forming apparatus reads various control values from a storage component of an installed toner cartridge and controls components of an image forming section based on the control values that are read. For example, the storage component of the toner cartridge stores a control value for correcting an electrical potential that is applied to a photosensitive drum by a charging device. Each of the control values is a value that is optimized for components of toner contained in the toner cartridge. Therefore, even when toner cartridges are exchanged, an image can be formed with appropriate image quality based on various control values that are read from the storage component of the installed toner cartridge.

SUMMARY

An image forming apparatus according to the present disclosure includes an image forming section, a content fraction calculating section, and an information storage section. The image forming section receives toner supplied from a toner cartridge. The content fraction calculating section calculates a content fraction of each toner contained in the image forming section in a situation in which the image forming section contains a mixture of a plurality of toners that have been supplied from different toner cartridges to one another. The information storage section stores therein, for each of the plurality of toners, a control value that is used to control a component of the image forming section. The image forming section forms an image based on respective content fractions of the plurality of toners and respective control values for the plurality of toners.

An image formation method according to the present disclosure includes storing a control value used for controlling a component of an image forming section for each toner contained in the image forming section in a situation in which the image forming section contains a mixture of a plurality of toners that have been supplied from different toner cartridges to one another, calculating a content fraction of each of the plurality of toners contained in the image forming section, and forming an image based on respective content fractions of the plurality of toners and respective control values for the plurality of toners.

BRIEF DESCRIPTION OF THE DRAWINGS

FIG. 3 illustrates an example of information stored in a storage component of a toner cartridge according to an embodiment of the present disclosure.

FIG. 5A illustrates an example of information stored in an information storage section according to an embodiment of the present disclosure, FIG. 5B illustrates an example of permitted ranges according to an embodiment of the present disclosure, and FIG. 5C illustrates an example of standard values according to an embodiment of the present disclosure.

FIG. 7 illustrates an example of information stored in an information storage section according to an embodiment of the present disclosure.

DETAILED DESCRIPTION

Figure 1:
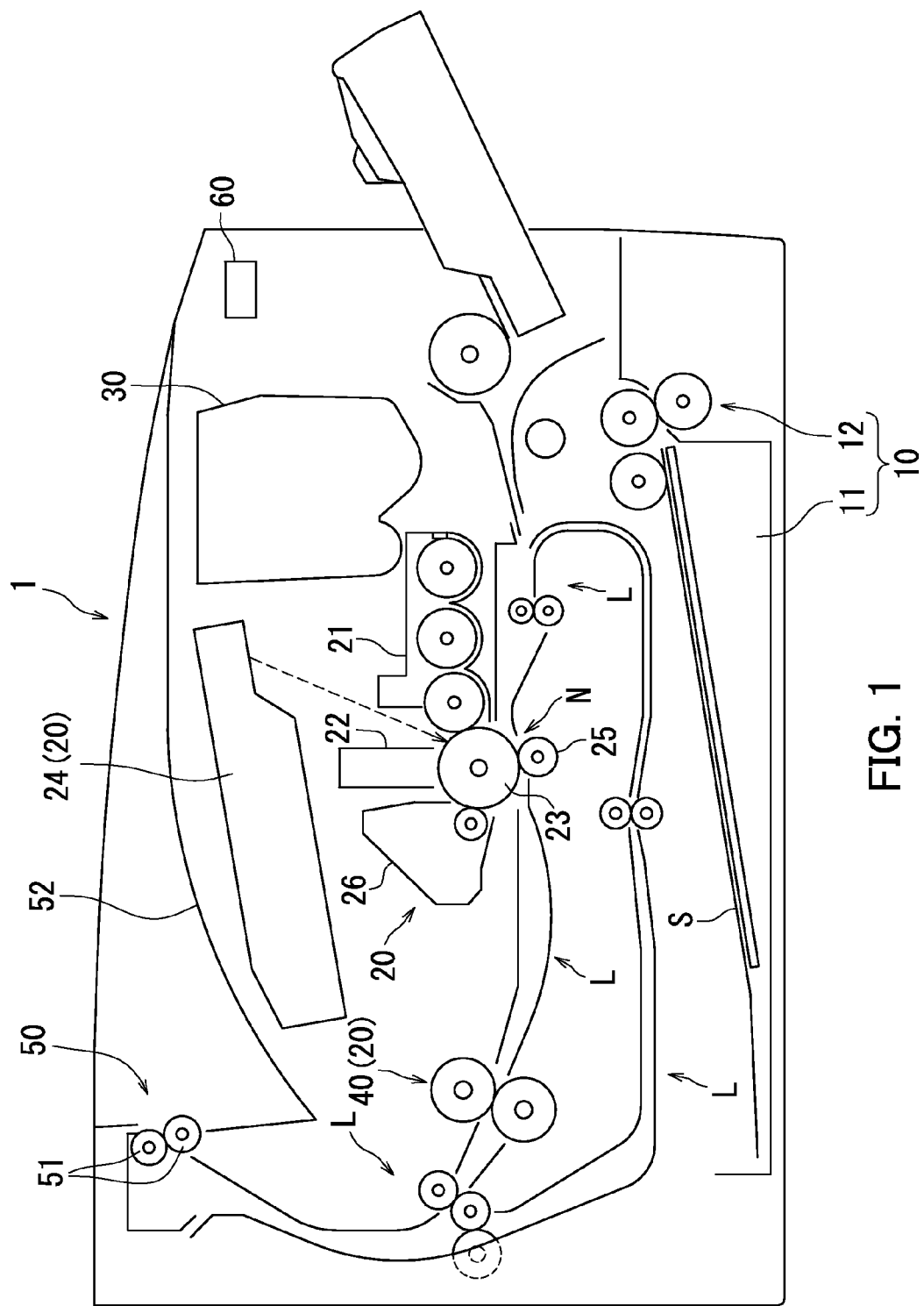
FIG. 1 is a schematic diagram illustrating configuration of an image forming apparatus according to an embodiment of the present disclosure.

The following explains an embodiment of an image forming apparatus and an image formation control method according to the present disclosure with reference to the drawings. Note that elements that are the same or equivalent are indicated by the same reference signs in the drawings and explanation thereof is not repeated.

First, an image forming apparatus 1 according to the embodiment of the present disclosure is explained with reference to FIG. 1. FIG. 1 is a schematic diagram illustrating configuration of the image forming apparatus 1. In the present embodiment, the image forming apparatus 1 is a printer that uses a primary transfer method.

The image forming apparatus 1 includes a sheet feed section 10, an image forming section 20, an installation section 30, an ejection section 50, a control section 60, and a conveyance section L.

The sheet feed section 10 includes a sheet feed cassette 11 and sheet feed rollers 12. The sheet feed cassette 11 contains sheets S therein. The sheet feed rollers 12 feed a sheet S stacked in the sheet feed cassette 11 to the conveyance section L. The conveyance section L conveys the sheet S that is fed by the sheet feed rollers 12 to the image forming section 20.

The image forming section 20 includes a developing device 21, a charging device 22, a photosensitive drum 23, a light-exposure device 24, a transfer member 25, a cleaning device 26, and a fixing section 40. The image forming section 20 forms an image on the sheet S.

The charging device 22 charges the photosensitive drum 23. The light-exposure device 24 irradiates the charged photosensitive drum 23 with laser light based on image data, thereby forming an electrostatic latent image. The developing device 21 causes toner to adhere to a circumferential surface of the photosensitive drum 23 having the electrostatic latent image formed thereon, thereby developing the electrostatic latent image into a toner image. The photosensitive drum 23 forms a nip N with the transfer member 25 that is located at a side of the photosensitive drum 23 corresponding to a conveyance path of the conveyance section L. Nip pressure of the nip N is adjusted by a drive device (not illustrated) causing the transfer member 25 to move closer to the photosensitive drum 23 or to move away from the photosensitive drum 23. The conveyance section L feeds the sheet S into the nip N. When the sheet S passes through the nip N, the toner image formed on the circumferential surface of the photosensitive drum 23 is transferred onto the sheet S. The cleaning device 26 removes residual toner from the surface of the photosensitive drum 23.

The installation section 30 has a toner cartridge installed therein. The toner cartridge is exchangeable. The toner cartridge installed in the installation section 30 supplies toner to the developing device 21.

The sheet S having the toner image transferred thereon is conveyed to the fixing section 40 by the conveyance section L. The fixing section 40 fixes the toner image to the sheet S by applying heat and pressure to the sheet S. The sheet S having the toner image fixed thereto is fed to the ejection section 50 by the conveyance section L.

The ejection section 50 includes an ejection roller pair 51 and an exit tray 52. The ejection roller pair 51 ejects the sheet S that is conveyed by the conveyance section L onto the exit tray 52.

The control section 60 includes a storage section. The storage section for example stores programs and setting information therein. The storage section includes random access memory (RAM) and read only memory (ROM). The control section 60 controls overall operation of the image forming apparatus 1 by executing various control programs that are pre-stored in the ROM.

Figure 2:
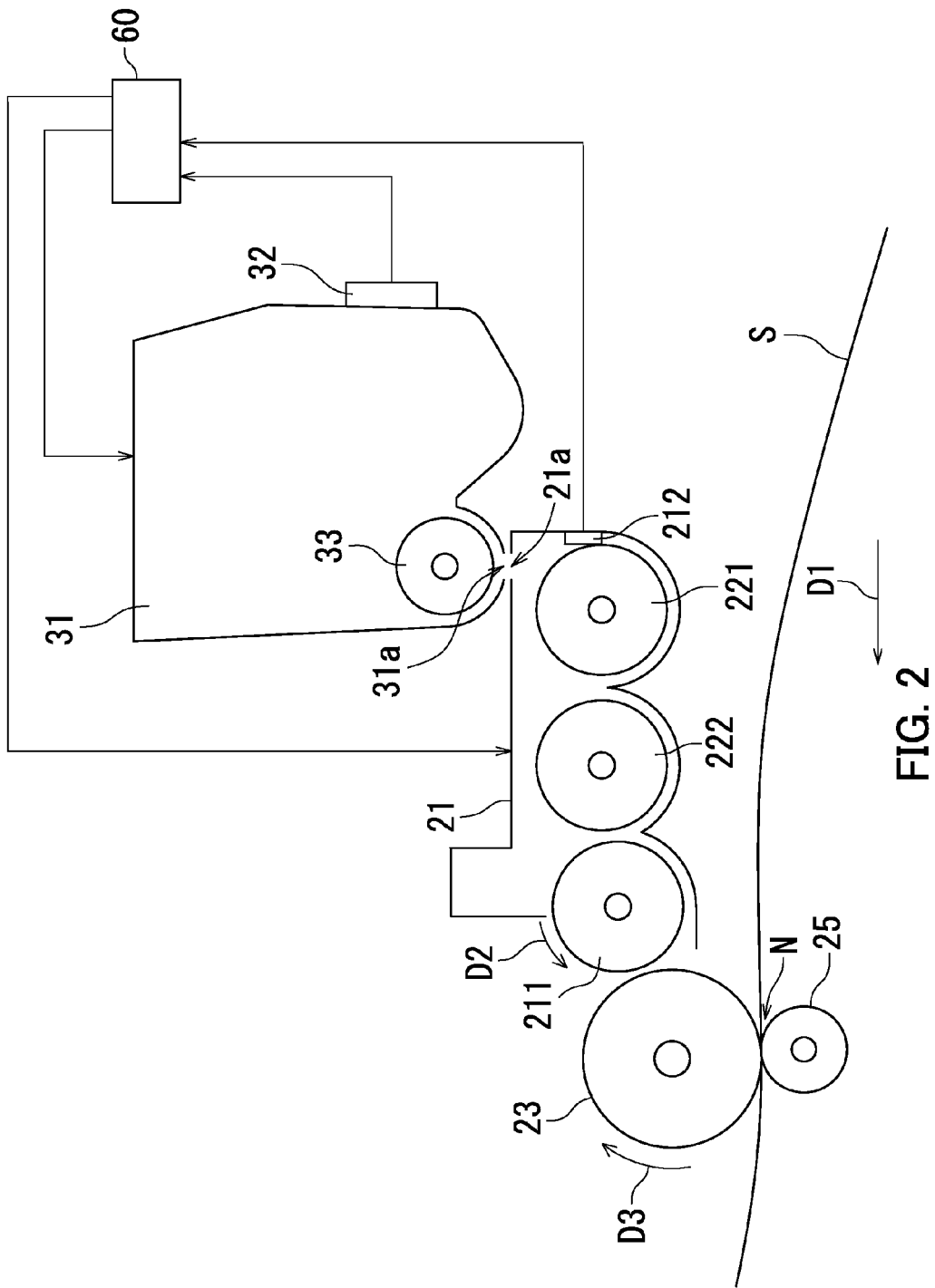
FIG. 2 is a schematic diagram illustrating the main components of a toner cartridge and a developing device according to an embodiment of the present disclosure.

The following explains operation of the developing device 21 and the toner cartridge installed in the installation section 30 with reference to FIGS. 2 and 3. FIG. 2 is a schematic diagram illustrating the main components of the toner cartridge and the developing device 21. FIG. 3 illustrates an example of information stored in non-volatile memory of the toner cartridge.

As illustrated in FIG. 2, a toner cartridge 31 includes non-volatile memory 32, which is a storage component, and a spiral member 33. The non-volatile memory 32 is for example EEPROM.

As illustrated in FIG. 3, the non-volatile memory 32 stores a serial number therein that is an identifier. Each toner cartridge 31 is allotted a unique serial number. The non-volatile memory 32 also stores various control values therein for controlling each component of the image forming section 20. The non-volatile memory 32 for example stores a charging control value X, a development control value Y, and a primary transfer control value Z. The charging control value X is a control value for controlling an electrical potential that is applied to the photosensitive drum 23 by the charging device 22. The development control value Y is a control value for controlling an electrical potential that is applied to a development roller 211 of the developing device 21. The primary transfer control value Z is a control value for controlling operation of the transfer member 25 and is used to adjust nip pressure. Each of the control values is a value that is optimized for components of toner contained in the toner cartridge 31.

As illustrated in FIG. 2, a toner replenishment opening 31a is located below one end of the spiral member 33. The spiral member 33 extends in a normal direction to the plane illustrated in FIG. 2. Through rotation thereof, the spiral member 33 stirs toner contained in the toner cartridge 31 while conveying the toner toward the toner replenishment opening 31a. As a result, toner is supplied into the developing device 21 from the toner replenishment opening 31a via a toner supply opening 21a. During the above, the amount of toner that is supplied to the developing device 21 corresponds to a number of rotations of the spiral member 33. The toner supply opening 21a is provided in an upper surface of the developing device 21 at a location opposite to the toner replenishment opening 31a of the installed toner cartridge 31.

The developing device 21 includes a first stirring member 221, a second stirring member 222, the development roller 211, and a sensor 212. The first stirring member 221 and the second stirring member 222 rotate, thereby stirring the toner. The stirred toner is caused to adhere to a circumferential surface of the development roller 211 that has been biased to a specific electrical potential. The development roller 211 is located opposite to the photosensitive drum 23 and rotates in direction D2 illustrated in FIG. 2. The photosensitive drum 23 rotates in the opposite direction (direction D3 illustrated in FIG. 2) to the development roller 211. Toner adhered to the circumferential surface of the development roller 211 scatters toward the photosensitive drum 23 due to a difference between the electrical potential of the photosensitive drum 23 and the electrical potential of the development roller 211 and adheres to the circumferential surface of the photosensitive drum 23. The sensor 212 detects the amount of toner contained in the developing device 21.

Toner adhered to the circumferential surface of the photosensitive drum 23 is transferred onto a sheet S in the nip N. The sheet S is conveyed in a conveyance direction D1 by the conveyance section L (refer to FIG. 1).

Figure 4:
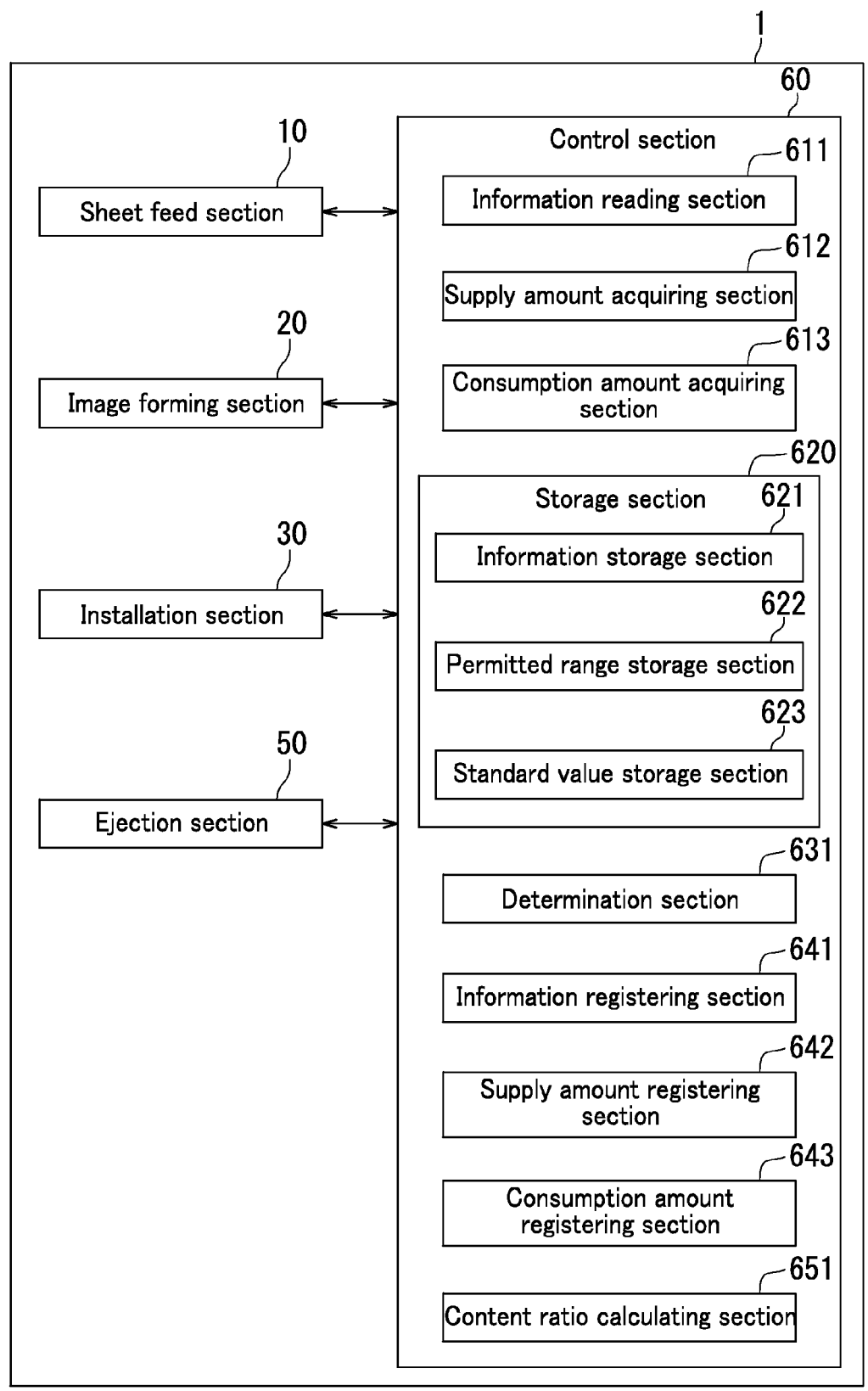
FIG. 4 is a block diagram of an image forming apparatus according to an embodiment of the present disclosure.

The following explains the control section 60 with reference to FIGS. 4 and 5A-5C. FIG. 4 is a block diagram of the image forming apparatus 1. FIG. 5A illustrates an example of information stored in an information storage section, FIG. 5B illustrates an example of permitted ranges for control values, and FIG. 5C illustrates an example of standard values.

The control section 60 includes an information reading section 611, a supply amount acquiring section 612, a consumption amount acquiring section 613, the storage section 620, a determination section 631, an information registering section 641, a supply amount registering section 642, a consumption amount registering section 643, and a content fraction calculating section 651.

The information reading section 611 reads a serial number and control values from the non-volatile memory 32 of the toner cartridge 31 installed in the installation section 30.

The supply amount acquiring section 612 acquires a supply amount indicating an amount of toner that is supplied to the developing device 21 from the toner cartridge 31 installed in the installation section 30. More specifically, the supply amount acquiring section 612 calculates the supply amount based on the number of rotations of the spiral member 33.

The storage section 620 includes an information storage section 621. The information storage section 621 stores a toner list 621a therein. As illustrated in FIG. 5A, control values, a total supply amount P, and a total consumption amount C are registered in the toner list 621a for each serial number (i.e., for each toner). In the present embodiment, the control values that are stored are a charging control value X, a development control value Y, and a primary transfer control value Z.

The consumption amount acquiring section 613 illustrated in FIG. 4 acquires a consumption amount for each toner associated with a serial number registered in the toner list 621a (i.e., for each of a plurality of toners supplied from different toner cartridges 31 to one another). The consumption amount of each of the toners indicates an amount of the toner that is consumed during image formation by the image forming section 20. More specifically, the consumption amount acquiring section 613 calculates the consumption amount of each of the toners based on detection results of the sensor 212 (refer to FIG. 2) before and after image formation. The consumption amount acquiring section 613 for example calculates the consumption amount of each of the toners by assuming that the same proportion of each toner contained in the developing device 21 is consumed during image formation.

The determination section 631 determines whether or not a serial number matching a serial number read by the information reading section 611 is already registered in the toner list 621a.

When the determination section 631 determines that a serial number matching the serial number read by the information reading section 611 is not already registered in the toner list 621a, the information registering section 641 causes the information storage section 621 to store (i.e., register in the toner list 621a) the serial number and control values that are read by the information reading section 611.

The supply amount registering section 642 causes the information storage section 621 to store (i.e., register in the toner list 621a), in association with a serial number, a supply amount that is acquired by the supply amount acquiring section 612. More specifically, for each of the toners (i.e., for each serial number), the supply amount registering section 642 registers a value (total supply amount P) in the toner list 621a that indicates a total of supply amounts of the toner that are acquired by the supply amount acquiring section 612.

The consumption amount registering section 643 causes the information storage section 621 to store (i.e., register in the toner list 621a), for each of the toners (i.e., for each serial number), a value (total consumption amount C) indicating a total of consumption amounts acquired by the consumption amount acquiring section 613.

The content fraction calculating section 651 calculates a content fraction R of each toner contained in the developing device 21. More specifically, the content fraction calculating section 651 calculates, for each of the toners, a difference between the total supply amount P and the total consumption amount C of the toner registered in the toner list 621a and thereby calculates a residual amount (content) of the toner contained in the developing device 21. Next, the content fraction calculating section 651 calculates a content fraction R of each of the toners from the respective contents of the toners. Supposing a situation in which a toner J and a toner K are contained in the developing device 21, a content fraction $R_j$ of the toner J and a content fraction $R_k$ of the toner K can be calculated as shown in Equations 1 and 2 respectively.

$$R_j = \text{content of toner } J/(\text{content of toner } J + \text{content of toner } K) \quad \text{(Equation 1)}$$

$$R_k = \text{content of toner } K/(\text{content of toner } J + \text{content of toner } K) \quad \text{(Equation 2)}$$

Based on the content fractions R, the control section 60 calculates execution control values (an execution charging control value Xp, an execution development control value Yp, and an execution primary transfer control value Zp) for controlling each component of the image forming section 20. Supposing once again the situation in which the toner J and the toner K are contained in the developing device 21, the execution charging control value Xp, the execution development control value Yp, and the execution primary transfer control value Zp can be calculated as shown in Equations 3-5 respectively.

$$Xp = (X_j \times R_j + X_k \times R_k) \quad \text{(Equation 3)}$$

$$Yp = (Y_j \times R_j + Y_k \times R_k) \quad \text{(Equation 4)}$$

$$Zp = (Z_j \times R_j + Z_k \times R_k) \quad \text{(Equation 5)}$$

Note that in Equations 3-5, $X_j$, $Y_j$, and $Z_j$ respectively represent a charging control value X, a development control value Y, and a primary transfer control value Z for the toner J, and $X_k$, $Y_k$, and $Z_k$ respectively represent a charging control value X, a development control value Y, and a primary transfer control value Z for the toner K. Also, $R_j$ represents a content fraction R of the toner J and $R_k$ represents a content fraction R of the toner K.

The image forming section 20 forms an image based on the execution control values (Xp, Yp, Zp).

The storage section 620 further includes a permitted range storage section 622 and a standard value storage section 623.

As illustrated in FIG. 5B, the permitted range storage section 622 stores a permitted range therein for each of the control values. In FIG. 5B, Xs-Xb represents a permitted range for a charging control value X, Ys-Yb represents a permitted range for a development control value Y, and Zs-Zb represents a permitted range for a primary transfer control value Z.

As illustrated in FIG. 5C, the standard value storage section 623 stores a standard value (default value) therein for each of the control values. In FIG. 5C, Xd represents a standard value for a charging control value X, Yd represents a standard value for a development control value Y, and Zd represents a standard value for a primary transfer control value Z.

When a control value that is read by the information reading section 611 is not within the permitted range for the control value, the information registering section 641 registers the standard value (Xd, Yd, Zd) in the toner list 621a instead of the control value (X, Y, Z) read by the information reading section 611.

Figure 6:
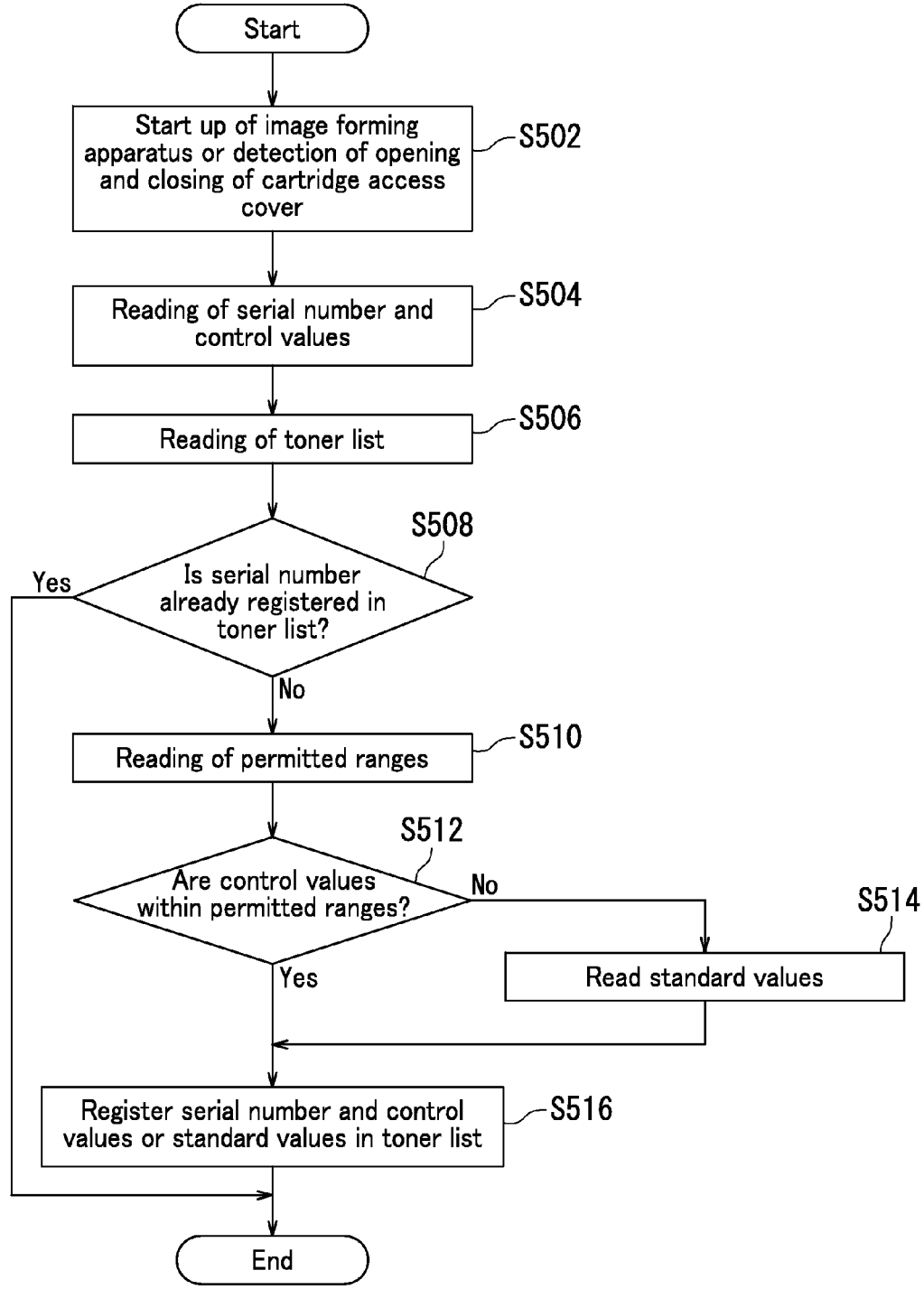
FIG. 6 is a flowchart illustrating a process for registering a serial number and control values in a toner list according to an embodiment of the present disclosure.
Figure 8:
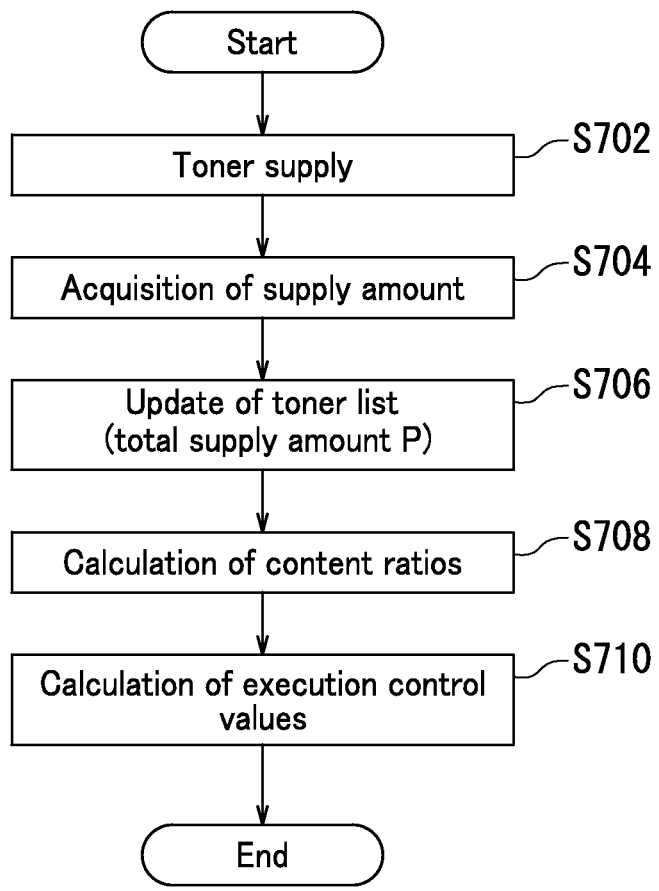
FIG. 8 is a flowchart illustrating a process for calculating an execution control value according to an embodiment of the present disclosure.
Figure 9:
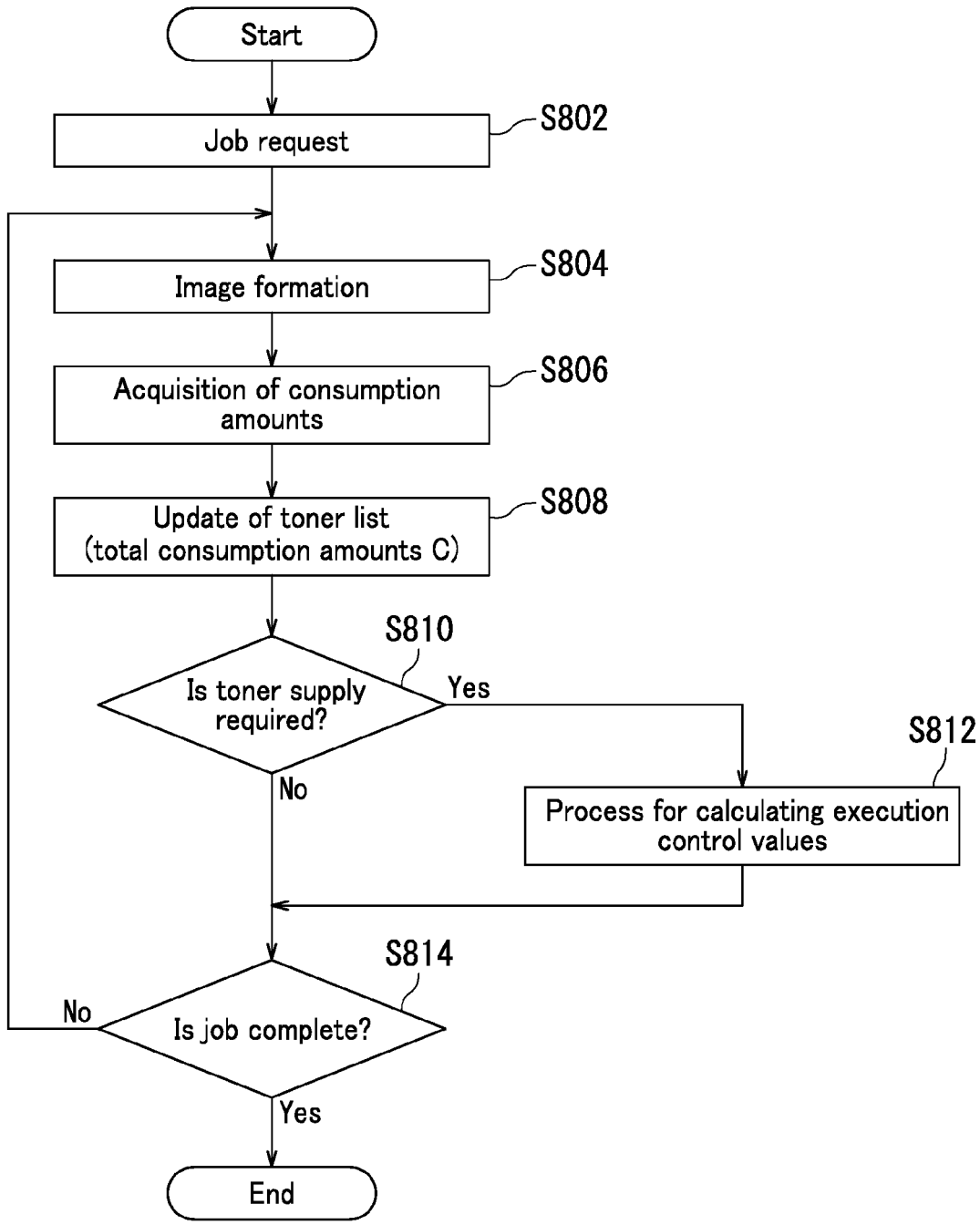
FIG. 9 is a flowchart illustrating an image formation operation by an image forming section according to an embodiment of the present disclosure.

The following provides detailed explanation of operation of the image forming apparatus 1 (i.e., an image formation control method) with reference to FIGS. 6-9. FIG. 6 is a flowchart illustrating a process for registering a serial number and control values in the toner list 621a. The serial number and the control values are read from the non-volatile memory 32 of the toner cartridge 31 installed in the installation section 30. FIG. 7 illustrates an example of information stored in the information storage section 621. FIG. 8 is a flowchart illustrating a process for calculating execution control values. FIG. 9 is a flowchart illustrating an image formation operation performed by the image forming section 20.

As illustrated in FIG. 6, by executing Steps S502 to S516 the image forming apparatus 1 registers, in the toner list 621*a*, the serial number and the control values that are stored in the non-volatile memory 32 of the toner cartridge 31 installed in the installation section 30. In the present embodiment, the toner cartridge 31 installed in the installation section 30 has a serial number m and has a charging control value $X_m$, a development control value Y, and a primary transfer control value $Z_m$ stored in the non-volatile memory 32 thereof as control values. Also, in the present embodiment it is supposed that permitted ranges for a charging control value X, a development control value Y, and a primary transfer control value Z are respectively Xs-Xb, Ys-Yb, and Zs-Zb, and that standard values for a charging control value X, a development control value Y, and a primary transfer control value Z are respectively Xd, Yd, and Zd. The following first explains a process that is executed when the image forming apparatus 1 starts up upon a power supply thereto being turned on.

Step S502: The power supply to the image forming apparatus 1 is turned on, thereby starting up the image forming apparatus 1.

Step S504: The information reading section 611 reads a serial number (m) and control values ($X_m$, $Y_m$, $Z_m$) from the non-volatile memory 32 of the toner cartridge 31 installed in the installation section 30.

Step S506: The control section 60 reads the toner list 621*a* (refer to FIG. 5A). Note that Steps S504 and S506 can be executed in either order.

Step S508: The determination section 631 determines whether or not a serial number matching the serial number (m) read by the information reading section 611 is are already registered in the toner list 621*a* (i.e., already stored in the information storage section 621). In other words, the determination section 631 determines whether or not the serial number (m) read by the information reading section 611 is already registered in the toner list 621*a*. In a situation in which a serial number matching the serial number (m) read by the information reading section 611 is already stored in the information storage section 621 (Step S508: Yes), the process ends. In a situation in which a serial number matching the serial number (m) read by the information reading section 611 is not already stored by the information storage section 621 (Step S508: No), the process proceeds to Step S510.

Step S510: The control section 60 reads permitted ranges (Xs-Xb, Ys-Yb, Zs-Zb) for the control values stored in the permitted range storage section 622.

Step S512: The control section 60 determines, for each of the control values read by the information reading section 611, whether or not the control value is within the preset permitted range for the control value. In the present embodiment, the charging control value $X_m$, the development control value $Y_m$, and the primary transfer control value $Z_m$ are respectively compared to the permitted ranges Xs-Xb, Ys-Yb, and Zs-Zb corresponding thereto. In a situation in which all of the control values read by the information reading section 611 are within the permitted ranges corresponding thereto (Step S512: Yes), the process proceeds to Step S516. In a situation in which one or more of the control values read by the information reading section 611 are not within in the permitted ranges corresponding thereto (Step S512: No), the process proceeds to Step S514.

Step S514: For each control value ($X_m$, $Y_m$, $Z_m$) that is not within the permitted range corresponding thereto, the control section 60 reads a standard value corresponding to the control value from among the standard values (Xd, Yd, Zd) stored in the standard value storage section 623.

Step S516: The information registering section 641 registers the serial number (m) read by the information reading section 611 in the toner list 621*a*. The information registering section 641 also registers each control value that is determined to be within the permitted range corresponding thereto. On the other hand, in a situation in which a standard value has been read in Step S514, the information registering section 641 registers the standard value instead of the control value read by the information reading section 611. For example, in a situation in which none of the charging control value $X_m$, the development control value $Y_m$, and the primary transfer control value $Z_m$ are within the permitted range (Xb-Xs, Yb-Ys, Zb-Zs) corresponding thereto, the information registering section 641 registers the serial number (m) and the standard values (Xd, Yd, and Zd) in the toner list 621*a*.

The process of Steps S502 to S516 is not only executed upon the image forming apparatus 1 being started up by turning on the power supply thereto, but is also executed when an access cover (door at the entrance to the installation section 30) is opened and closed in order to exchange toner cartridges 31 while the image forming apparatus 1 is executing a job or while the image forming apparatus 1 is on standby for a job (Step S502).

Note that the process of Steps S502 to S516 may alternatively be executed only when the image forming apparatus 1 is started up by turning on the power supply thereto or may be executed only when the access cover is opened and closed.

By executing the process of Steps S502 to S516 explained above, the image forming apparatus 1 registers, in the toner list 621*a*, the serial number and the control values that are stored in the non-volatile memory 32 of the toner cartridge 31 installed in the installation section 30.

The following explains a process performed by the control section 60 for calculating execution control values with reference to FIG. 8. When the control section 60 determines that the amount of toner contained in the developing device 21 is less than or equal to a specific value based on a detection result of the sensor 212, the control section 60 operates the spiral member 33 of the toner cartridge 31 in order to supply toner to the developing device 21.

Step S702: The toner cartridge 31 supplies toner to the developing device 21.

Step S704: The supply amount acquiring section 612 acquires a supply amount indicating an amount of toner supplied to the developing device 21.

Step S706: The supply amount registering section 642 registers a total supply amount P in the toner list 621*a* in association with a serial number. Through the above, the toner list 621*a* (total supply amount P) is updated.

Step S708: The content fraction calculating section 651 calculates a content fraction R (refer to Equations 1 and 2 shown further above) for each of the toners contained in the developing device 21 based on the total consumption amount C and the total supply amount P of each of the toners.

Step S710: The control section 60 calculates execution control values (Xp, Yp, Zp) (refer to Equations 3-5 shown further above) based on the content fraction R of each of the toners and the control values for each of the toners.

By executing the process of Steps S702 to S710 explained above, the image forming apparatus 1 calculates the execution control values.

Next, the image forming apparatus 1 forms an image by executing a process of Steps S802 to S814 as illustrated in FIG. 9. The present embodiment is explained for a situation in which the developing device 21 containers a plurality of toners that have been supplied from different toner cartridges 31 to one another and in which execution control values (Xp, Yp, Zp) have already been calculated.

Step S802: The control section 60 receives a job request.

Step S804: The image forming section 20 forms an image based on the execution control values (Xp, Yp, Zp). The execution control values (Xp, Yp, Zp) are calculated according to the process explained with reference to FIG. 8.

Step S806: The consumption amount acquiring section 613 acquires a consumption amount of each of the toners by the developing device 21 during image formation.

Step S808: The consumption amount registering section 643 updates each total consumption amount C in the toner list 621a.

Step S810: The control section 60 determines whether or not toner supply is required. In a situation in which the control section 60 determines that toner supply is required (Step S810: Yes), the process proceeds to Step S812. In a situation in which the control section 60 determines that toner supply is not required (Step S810: No), the process proceeds to Step S814.

Step S812: The control section 60 calculates execution control values according to the process for execution control value calculation explained with reference to FIG. 8.

Step S814: The control section 60 determines whether or not the job is complete. In a situation in which the control section 60 determines that the job is complete (Step S814: Yes), the process ends. In a situation in which the control section 60 determines that the job is not complete (Step S814: No), the process returns to Step S804.

By executing the process of Steps S802 to S814 explained above, the image forming apparatus 1 forms an image.

Through the above, the embodiment of the present disclosure has been explained with reference to the drawings (FIGS. 1-9).

According to the present embodiment, even in a situation in which the image forming section 20 (developing device 21) contains a mixture of a plurality of toners that have been supplied from different toner cartridges 31 to one another, each element of the image forming section 20 can be controlled based on the content fraction R of each of the toners and the control values for each of the toners. Therefore, reduction in image quality can be inhibited. The reason for the above is that in a situation in which a toner image is formed using toner that is a mixture of toners supplied from different toner cartridges 31, reduced image quality may unfortunately occur due to control values read from a storage component of a toner cartridge that is currently installed not corresponding to components of the mixture of toners used to form the toner image, but such reduction in image quality is inhibited according to the present disclosure by setting control values in correspondence with the components of the mixture of toners used in image formation.

The present disclosure is of course not limited to the above embodiment and can be implemented in various forms so long as such implementations do not deviate from the intended scope of the present disclosure.

For example, although the above embodiment is explained for a situation in which the present disclosure is applied to a printer, the present disclosure can also be applied to a copier, a facsimile machine, or a multifunction peripheral that combines respective functions thereof.

Also, although the above embodiment is explained for a situation in which the present disclosure is applied to an image forming apparatus that uses a primary transfer method, the present disclosure can also be applied to an image forming apparatus that uses a secondary transfer method.

Also, although the above embodiment is explained for a situation in which an image is formed based on the charging control value Xp, the development control value Yp, and the primary transfer control value Zp, an image may alternatively be formed based on any one or two control values among the charging control value Xp, the development control value Yp, and the primary transfer control value Zp.

Also, although the above embodiment is explained using the charging control value X, the development control value Y, and the primary transfer control value Z as examples of control values, the control values are not limited to the above examples thereof. For example, a control value for controlling temperature of the fixing section 40 may be stored in the non-volatile memory 32 of the toner cartridge 31 or a control value for controlling rotational speed of the first stirring member 221 and the second stirring member 222 of the developing device 21 may be stored in the non-volatile memory 32 of the toner cartridge 31.

What is claimed is:

1. An image forming apparatus comprising:
an installation section in which a toner cartridge is to be installed among a plurality of toner cartridges containing toners in a same color in an exchangeable manner;
an image forming section configured to form an image on a sheet using a toner supplied from a toner cartridge among the toner cartridges that is installed in the installation section; and
a control section configured to control an image forming operation by the image forming section, wherein
the image forming section includes a developing device, a photosensitive drum, and a transfer member,
the developing device is configured to form a toner image on a circumferential surface of the photosensitive drum by causing the toner supplied from the toner cartridge installed in the installation section to adhere to the photosensitive drum,
the photosensitive drum is configured to bear the toner image,
the transfer member is configured to transfer the toner image that the photosensitive member bears to the sheet,
in a situation of toner cartridge exchange, the developing device contains a mixed toner of a plurality of toners supplied from the plurality of toner cartridges,
the control section includes a storage section that stores therein a control program for controlling the image forming operation by the image forming section,
through execution of the control program, the control section
calculates a content fraction of each toner contained in the mixed toner,
causes the storage section to store therein, in association with each of the plurality of toners, a control value used for controlling a component of the image forming section,
calculates an execution control value by multiplying the content fraction of each of the toners by the control value associated with each of the toners, and
controls the image forming operation by the image forming section based on the execution control values.

2. The image forming apparatus according to claim 1, wherein the control section reads a control value and an identifier from a storage component of a toner cartridge currently installed in the installation section, the identifier being unique to the toner cartridge, determines whether or not an identifier matching the identifier read from the storage component of the toner cartridge currently installed in the installation section is already stored in the storage section, and causes the storage section to store the identifier and the control value read from the storage component of the toner cartridge currently installed in the installation section when determining that an identifier matching the identifier read from the storage component of the toner cartridge installed in the installation section is not already stored in the storage section.

3. The image forming apparatus according to claim 2, wherein the control section causes the storage section to store a total supply amount in association with an identifier of each of the plurality of toner cartridges, the total supply amount indicating a total amount of toner supplied from a corresponding one of the toner cartridges to the developing device, acquires a consumption amount for each toner, the consumption amount indicating an amount of the toner that is consumed during the image forming operation by the image forming section, and calculates the content fraction of each of the plurality of toners based on respective consumption amounts and respective total supply amounts of the plurality of toners.

4. The image forming apparatus according to claim 2, wherein the storage section stores in advance therein information pertaining to a permitted range for each of the control values and a standard value for each of the control values, and when a control value read from the storage component of the toner cartridge currently installed to the installation section is not within the permitted range, the control section causes the storage section to store a standard value for the control value read from the storage component of the toner cartridge currently installed in the installation section therein in association with the identifier read from the storage component of the toner cartridge currently installed in the installation section instead of the control value read from the storage component of the toner cartridge currently installed in the installation section.

5. The image forming apparatus according to claim 1, wherein the control value is at least one of a charging control value, a development control value, and a primary transfer control value.

6. An image formation control method used in an image forming apparatus including an installation section in which a toner cartridge is to be installed among a plurality of toner cartridges containing toners in a same color in an exchangeable manner, comprising:

in a situation in which a developing device of the image forming apparatus contains a mixed toner of a plurality of toners supplied from the plurality of toner cartridges, through execution of a control program stored in a storage section of the image forming apparatus, causing a control section of the image forming apparatus to calculate a content fraction of each of the plurality of toners contained in the mixed toner;

causing the storage section to store therein, in association with each of the plurality of toners, a control value used for controlling a component of the image forming apparatus;

causing the control section to calculate an execution control value by multiplying the content fraction of each of the toners by the control value associated with each of the toners; and causing the control section to control an image forming operation by the image forming apparatus based on the execution control values.

7. The image formation control method according to claim 6, wherein the causing the storage section to store the control value includes:

reading a control value and an identifier from a storage component of a toner cartridge that is currently installed in the installation section, the identifier being unique to the toner cartridge;

determining whether or not an identifier matching the identifier that is read from the storage component of the toner cartridge currently installed in the installation section is already stored in the storage section; and causing the storage section to store the identifier and the control value that are read from the storage component of the toner cartridge currently installed in the installation section when determining that an identifier matching the identifier that is read from the storage component of the toner cartridge currently installed in the installation section is not already stored in the storage section.

8. The image formation control method according to claim 7, wherein the causing the control section to calculate the content fraction of each of the plurality of toners includes:

causing the storage section to store a total supply amount in association with the identifier, the total supply amount indicating a total amount of toner that is supplied from a corresponding one of the toner cartridges to the developing device;

causing the control section to acquire a consumption amount of each toner, the consumption amount indicating an amount of the toner that is consumed during an image forming operation by an image forming section of the image forming apparatus; and causing the control section to calculate the content fraction of each of the plurality of toners based on respective total supply amounts and respective consumption amounts of the plurality of toners.

9. The image formation control method according to claim 7, further comprising causing the storage section to store a standard value in association with the identifier read from the storage component of the toner cartridge currently installed in the installation section instead of the control value when the control value read from the storage component of the toner cartridge currently installed in the installation section is not within a permitted range.

* * * * *